United States Patent [19]
Matsui et al.

[11] Patent Number: 5,993,536
[45] Date of Patent: Nov. 30, 1999

[54] METHOD OF DECOLORING COLORED CONCRETE

[75] Inventors: Toshiki Matsui; Masaru Isoai; Yasuhiko Fujii; Tomoyuki Imai, all of Hiroshima, Japan

[73] Assignee: Toda Kogyo Corporation, Japan

[21] Appl. No.: 09/018,330

[22] Filed: Feb. 4, 1998

[30] Foreign Application Priority Data

Feb. 5, 1997 [JP] Japan .................................. 9-038476

[51] Int. Cl.$^6$ .............................. C04B 14/30; C09C 1/36
[52] U.S. Cl. ......................... 106/712; 106/410; 106/436; 106/440; 106/441; 106/439
[58] Field of Search .................... 106/436, 712, 106/439, 440, 441, 410

[56] References Cited

U.S. PATENT DOCUMENTS

| | | | |
|---|---|---|---|
| 3,102,039 | 8/1963 | Manecke | 106/712 |
| 4,946,505 | 8/1990 | Jungk | 106/712 |
| 5,008,143 | 4/1991 | Armanini | 106/436 |
| 5,199,986 | 4/1993 | Krockert et al. | 106/712 |
| 5,215,584 | 6/1993 | Buxbaum et al. | 106/712 |
| 5,484,481 | 1/1996 | Linde et al. | 106/712 |
| 5,541,096 | 7/1996 | Nomura et al. | 435/176 |
| 5,558,708 | 9/1996 | Johansen, Jr. et al. | 106/712 |

FOREIGN PATENT DOCUMENTS

| | | |
|---|---|---|
| 0 365 046 | 4/1990 | European Pat. Off. . |
| 439 111 | 7/1991 | European Pat. Off. . |
| 0634 363 A1 | 1/1995 | European Pat. Off. . |
| 3 324 400 A1 | 1/1985 | Germany . |
| 1121275 | 10/1984 | U.S.S.R. ................ 106/712 |

OTHER PUBLICATIONS

Chemical Abstract No. 82:128771, abstract of Soviet Union Patent Specification No. 447385 (Oct. 1974).
Patent Abstracts of Japan vol. 016, No. 098 (C–0918) Mar. 11, 1992 & JP 03 279242A (Dec. 1991).
Database WPI Section Ch, Week 7828 Derwent Class L02, AN 78–50751A XP002064363 & JP 53 063 412A (Jun. 1978).

*Primary Examiner*—Anthony Green
*Attorney, Agent, or Firm*—Nixon & Vanderhye

[57] ABSTRACT

A method of decoloring a colored concrete, comprises adding to the colored concrete, a decoloring pigment comprising a titanium oxide pigment, or a titanium oxide pigment and a pigment having a complementary color relative to color of the colored concrete. Such method can decolore the color of the colored concrete residue which attaches to or remains in production facilities in order to return a color thereof to that of an ordinary plain concrete, without works or treatments for washing-out or removing the colored concrete residue which attaches to or remains in the production facilities, in which the works or treatments are required in the case where the production facilities are used for the production of an ordinary plain concrete after the colored concrete has been produced therein, and without works or treatments for purifying a waste water generated upon washing-out or removing the residue and for making the waste water harmless; and a pigment used therefor.

13 Claims, No Drawings

METHOD OF DECOLORING COLORED CONCRETE

BACKGROUND OF THE INVENTION:

The present invention relates to a method of decoloring a colored concrete. More particularly, the present invention relates to a method of decoloring a colored concrete residue which attaches to or remains in production facilities in order to return a color thereof to that of an ordinary plain concrete, without works or treatments for washing-out or removing the colored concrete residue which attaches to or remains in the production facilities, in which the works or treatments are required in the case where the production facilities are used for the production of an ordinary plain concrete after the colored concrete has been produced therein, and without works or treatments for purifying a waste water generated upon washing-out or removing the residue and for making the waste water harmless; and a pigment used therefor.

In recent years, there have been a variety of needs for concrete constructions because of advancement of industrial structure and improvement in people's life in association with the development of industry and economy. In consequence, the concrete constructions have been demanded to satisfy conformity to natural environment or beauty.

In order to meet such a demand, there has been an increasing tendency that dry-as-dust concrete constructions are colored so as to be harmonized with nature or enhance the beauty or favorableness. For this reason, colored concrete constructions have been presently spotlighted.

Hitherto, the colored concrete constructions have been constructed using a colored concrete which is prepared by adding not more than 10% by weight of powdery or granular coloring pigment to a cement admixture composed usually of cement, coarse aggregate (gravel), fine aggregate (sand), water and various additives such as an admixing agent, and then kneading the resultant mixture. The colored concrete has been widely used in various constructions such as buildings, pavements of park promenades, roads, bulkheads for shore or bank protection, and the like, mainly for purposes of conformity to natural environment and beauty.

Meanwhile, in the production of the colored concrete, a residue of the colored concrete (which is composed substantially of mortar containing almost no coarse aggregate and the like) has attached to concrete production facilities such as a mixer or a belt conveyer, or to an inside of drum of a ready-mixed concrete conveying truck (agitator truck). Consequently, in the case where it is intended to produce other colored concrete or ordinary plain concrete in same production facilities or agitator trucks after the production of the colored concrete, it is necessary to recover the colored concrete residue attached thereto for its reuse, or wash out or remove the colored concrete residue therefrom.

As the method for recovering a concrete residue for its reuse, in Attachment 10 of JIS A 5308, there has been described a method of using mortar (concrete residue) which attaches to an inside of an agitator truck. In the method described in JIS A 5308, after concrete is completely unloaded, i.e., a whole amount of concrete is discharged from the agitator truck, a mortar residue which attaches to drum inner walls, mixing blades and the like of the agitator truck is slurried using a mortar stabilizer and then the resultant slurry is mixed with a fresh ordinary plain concrete.

However, in the case where the colored concrete residue, there arises a problem that when a fresh ordinary plain concrete (uncolored concrete) is loaded and mixed with the colored concrete residue, the resultant mixed concrete is wholly colored by pigments contained in the colored concrete residue, thereby making the resultant mixed concrete non-reusable.

On the other hand, in the case where the colored concrete residue attached is washed out, it has been demanded that colored concrete-containing waste water generated upon cleaning the production facilities for ready-mixed concrete, such as mixers, belt conveyers and the like, or an inside of drum of the agitator truck, should be purified and rendered harmless before being discharged from these production facilities or agitator trucks, or should be recovered for reuse thereof.

However, in the case of the colored concrete-containing waste water, since a supernatant liquid obtained by separating cement, fine aggregate and the like from the waste water is disadvantageously colored, it is impossible to reuse the supernatant liquid as a kneading water. Further, operations for purifying the supernatant liquid and making it harmless are complicated and it is extremely difficult to purify the supernatant liquid and make it harmless. Incidentally, the reason why it is difficult to purify the supernatant liquid is considered such that a coloring pigment contained in the colored concrete residue is readily dispersed in the supernatant liquid by a cement dispersant (admixing agent) usually mixed into a cement admixture of the colored concrete upon the production thereof. It is further considered that in the case where the coloring pigment is surface-treated in order to enhance its dispersibility in the cement admixture, the supernatant liquid is more readily colored.

In the field of mortars composed usually of cement, sand and water, which contain no coarse aggregate, colored mortars also have the same problems as described hereinbefore.

As described above, technical problems in the fields of colored concrete production are how to recover and reuse the colored concrete residue or colored mortar residue which attaches to production facilities thereof, or how to purify the colored concrete-containing waste water and render it harmless to discharge out of the production facilities or to obtain a colorless transparent supernatant liquid for its reuse as a kneading water. Nevertheless, no simple and effective methods therefor has been proposed.

As a result of the present inventor's earnest studies for solving the above-mentioned problems, it has been found that by adding to the colored concrete residue (i) a titanium oxide pigment, or (ii) a titanium oxide pigment and a pigment having a complementary color relative to the color of a coloring pigment contained in a colored concrete, the color of a hardened concrete containing the colored concrete residue can be similar to that of an ordinary plain concrete. The present invention has been attained based on the finding.

SUMMARY OF THE INVENTION

It is an object of the present invention to provide a method of decoloring a colored concrete, which enables a residue of the colored concrete to be readily reused as an ordinary plain concrete without complicated treatments.

It is another object of the present invention to provide a decoloring pigment for a colored concrete, which enables the colored concrete residue to be readily reused as an ordinary plain concrete with a high productivity.

To accomplish the aims, in accordance with a first aspect of the present invention, there is provided a method of decoloring a colored concrete, comprising adding to the colored concrete, a decoloring pigment comprising (i) a titanium oxide pigment, or (ii) a titanium oxide pigment and a pigment having a complementary color relative to the color of the colored concrete.

In a second aspect of the present invention, there is provided a method of decoloring a colored concrete, comprising adding a decoloring pigment comprising a titanium oxide pigment to the colored concrete.

In a third aspect of the present invention, there is provided a method of decoloring a colored concrete, comprising adding to the colored concrete, a decoloring pigment comprising a titanium oxide pigment and a pigment having a complementary color relative to the color of the colored concrete.

In a fourth aspect of the present invention, there is provided a method of decoloring a colored concrete, comprising adding to said colored concrete, a decoloring pigment comprising a titanium oxide pigment, or a titanium oxide pigment and a pigment having a complementary color relative to color of the colored concrete, in the form of granulated particles having an average particle diameter of 300 to 1,500 µm and a porosity of 0.1 to 0.3.

In a fifth aspect of the present invention, there is provided a method of using a decoloring pigment comprising (i) a titanium oxide pigment, or (ii) a titanium oxide pigment and a pigment having a complementary color relative to the color of a colored concrete, for decoloring the colored concrete.

In a sixth aspect of the present invention, there is provided a method of using a decoloring pigment comprising (i) a titanium oxide pigment, or (ii) a titanium oxide pigment and a pigment having a complementary color relative to the color of a colored concrete, for decoloring the colored concrete, in the form of granulated particles having an average particle diameter of 300 to 1,500 µm and a porosity of 0.1 to 0.3.

In a seventh aspect of the present invention, there is provided a decoloring pigment comprising at least one pigment selected from the group consisting of magnetite, maghemite, hematite, iron oxide hydroxide, chromium oxide, cobalt blue, phthalocyanine blue and phthalocyanine green, which is a pigment having a complementary color relative to color of a colored concrete, and 25 to 99% by weight of a titanium oxide pigment.

In an eighth aspect of the present invention, there is provided a decoloring pigment comprising granulated particles comprising at least one pigment selected from the group consisting of magnetite, maghemite, hematite, iron oxide hydroxide, chromium oxide, cobalt blue, phthalocyanine blue and phthalocyanine green, which is a pigment having a complementary color relative to color of a colored concrete, and 25 to 99% by weight of a titanium oxide pigment, and having an average particle diameter of 300 to 1,500 µm and a porosity of 0.1 to 0.3.

DETAILED DESCRIPTION OF THE INVENTION

The decoloring pigment used in the present invention comprises (i) a titanium oxide pigment, (ii) a titanium oxide pigment and a pigment having a complementary color relative to the color of a coloring pigment contained in the colored concrete (hereinafter referred to merely as "complementary pigment").

The "colored concrete" in the present invention means an unhardened fresh colored concrete and colored mortar. The "ordinary plain concrete" in the present invention means an unhardened fresh uncolored concrete and an unhardened uncolored mortar, and the hardened concrete obtained from such ordinary plain concrete has L* value of 50 to 80, a* value of −2.0 to 0.5 and b* value of 2.0 to 8.0 when expressed by the colorimetric system (L*, a*, b*) defined according to JIS Z 8730.

The "production facilities" in the present invention mean apparatuses used for the production of concrete, such as plant mixers, belt conveyers and the like, in a factory for ready-mixed concrete, or drums and the like of agitator trucks.

The average particle diameter of the decoloring pigments used in the present invention may be in the range of usually 0.05 to 20 µm, preferably 0.1 to 10 µm.

The titanium oxide pigment as the decoloring pigment according to the present invention can be applied to such a concrete containing an achromatic color pigment, i.e., a black to gray pigment. Specifically, when the titanium oxide pigment is added to the concrete which is colored to black to gray using magnetite pigment or carbon black pigment, the lightness of the concrete can be improved, thereby decoloring the black- to gray-colored concrete and obtaining a hardened concrete whose color is similar to that of the ordinary plain concrete.

The titanium oxide pigments used in the present invention are not particularly restricted, but titanium oxide pigments exhibiting a good affinity with cement are preferred.

As the complementary pigments used in the present invention, which have a complementary color relative to the color of the coloring pigment contained in the colored concrete, pigments exhibiting an alkali resistance and a good affinity with cement are preferred. Examples of these complementary pigments may include inorganic pigments such as magnetite, maghemite, hematite, iron oxide hydroxide (FeO(OH)), chromium oxide ($Cr_2O_3$), cobalt blue ($CoAl_2O_4$) and the like, and organic pigments such as phthalocyanine blue, phthalocyanine green and the like. These complementary pigments may be used singly or in the form of a mixture of any two or more thereof.

Various combinations of the coloring pigments contained in the colored concrete, and the decoloring pigments each comprising (i) the titanium oxide pigment capable of improving a lightness of the hardened concrete, or the pigment composition comprising the complementary pigment having a complementary color relative to the color of the coloring pigment and the titanium oxide pigment capable of preventing a lightness of the hardened concrete from being deteriorated, are exemplified in Table 1 below.

TABLE 1

| Kind of coloring pigment contained in colored concrete | Kind and composition of decoloring pigment |
| --- | --- |
| Hematite | (1) Titanium oxide: 40–80 wt. %, phthalocyanine blue: 10–45 wt. % and chromium oxide: 5–25 wt. %<br>(2) Titanium oxide: 40–80 wt. %, cobalt blue: 10–40 wt. % and chromium oxide: 5–30 wt. % |
| Magnetite | (1) Titanium oxide: 90–99 wt. % and chromium oxide: 1–10 wt. %<br>(2) Titanium oxide: 90–99 wt. % and goethite: 1–10 wt. %<br>(3) Titanium oxide |
| Goethite | (1) Titanium oxide: 25–70 wt. %, phthalocyanine blue: 15–60 wt. % and hematite: 5–35 wt. %<br>(2) Titanium oxide: 25–70 wt. %, cobalt blue: 25–75 wt. %, and hematite: 0–10 wt.% |

TABLE 1-continued

| Kind of coloring pigment contained in colored concrete | Kind and composition of decoloring pigment |
|---|---|
| Chromium oxide | (1) Titanium oxide: 40–80 wt. %, phthalocyanine blue: 10–40 wt. % and hematite: 5–30 wt. % <br> (2) Titanium oxide: 40–80 wt. %, cobalt blue: 15–40 wt. % and hematite: 5–20 wt. % |
| Cobalt blue | Titanium oxide: 25–75 wt. % and goethite: 75–25 wt. % |
| Phthalocyanine blue | Titanium oxide: 40–80 wt. %, goethite: 5–35 wt. % and hematite: 10–40 wt. % |
| Phthalocyanine green | Titanium oxide: 40–80 wt. % and hematite: 20–60 wt. % |
| Carbon black | (1) Titanium oxide: 90–99 wt. % and chromium oxide: 1–10 wt. % <br> (2) Titanium oxide: 90–99 wt. % and goethite: 1–10 wt. % <br> (3) Titanium oxide |

Incidentally, when the complementary pigment is added to the colored concrete in order to convert the color of the colored concrete into such a color inherent to the ordinary plain concrete adjusting the color thereof, there is a tendency that the lightness thereof is deteriorated. In order to prevent the lightness from being deteriorated upon converting the color of the colored concrete into that of the ordinary plain concrete, or in order to improve the lightness thereof, the titanium oxide pigment may be used.

In the decoloring pigment used in the present invention which comprises the complementary pigment and the titanium oxide pigment, the content of the complementary pigment is usually 1 to 75% by weight, preferably 5 to 50% by weight, and the content of the titanium oxide pigment is usually 25 to 99% by weight, preferably 50 to 95% by weight.

The amount of the decoloring pigment added can be defined according to the amount of the coloring pigment contained in the colored concrete residue. Accordingly, in the case where the amount of the coloring pigment contained in the colored concrete residue is previously known, such a predetermined amount of the decoloring pigment as required for making the colored concrete residue colorless can be added thereto. The amount of the decoloring pigment added is in the range of usually 0.5 to 10 parts by weight, preferably 1 to 10 parts by weight, more preferably 1 to 8 parts by weight based on one part by weight of the coloring pigment contained in the colored concrete to be decolored.

Incidentally, since the amount of the coloring pigment contained in the colored concrete can be approximately determined depending upon the desired color thereof and since the amount of the colored concrete residue which attaches to the production facilities can be kept approximately constant, it is easy to estimate the amount of the coloring pigment contained in the colored concrete residue.

The method of using the decoloring pigment according to the present invention may include (1) a method of adding the decoloring pigment to a virgin ready-mixed colored concrete residue to convert the color of the colored concrete residue into the color inherent to the ordinary plain concrete, thereby reusing the obtained concrete as an ordinary plain concrete; and (2) a method of inserting the decoloring pigment into the production facilities where the ordinary plain concrete is produced and to which a residue of colored concrete has attached, thereby obtaining a concrete having the color inherent to the ordinary plain concrete.

For example, in the case (1), the decoloring pigment is directly added to the virgin ready-mixed colored concrete accommodated in an agitator truck, and then the mixture is kneaded together therein so as to convert the color of the colored concrete residue into the color inherent to the ordinary plain concrete, thereby obtaining the ordinary plain concrete. In the case (2), after the colored concrete is produced in the production facilities of the ready-mixed concrete factory or agitator trucks, the residue of the colored concrete which attaches to the production facilities is decolored and a fresh ordinary plain concrete is produced in the same production facilities. For example, in the case where the residue of the colored concrete which attaches to an inside of the plant mixers, belt conveyers in the ready-mixed concrete factory, or the drums of the agitator truck is decolored and the ordinary plain concrete is produced therein, both raw materials for the ordinary plain concrete and the decoloring pigment are introduced into the plant mixers, belt conveyers in the ready-mixed concrete factory, or the drums of the agitator truck.

In this case (2), the decoloring pigment may be added to the ordinary plain concrete in an amount of usually 0.02 to 3.0% by weight, preferably 0.05 to 2.0% by weight, more preferably 0.1 to 1.0% by weight based on the weight of cement contained in the fresh ordinary plain concrete. When the amount of the decoloring pigment added is less than 0.02% by weight, the decoloring effect may not be sufficiently exhibited. On the other hand, when the amount of the decoloring pigment added is more than 3.0% by weight, the ordinary plain concrete may be disadvantageously colored to the color tone of the decoloring pigment.

The decoloring pigment used in the present invention may be added to the ordinary plain concrete in the form of particles as it is, and preferably in the form of granulated particles. By using the granulated decoloring pigment particles, dusts can be prevented from being generated upon handling, and there can be obtained the effect of readily dispersing the decoloring pigment in the concrete because of improved water wettability thereof.

The average particle diameter of the granulated decoloring pigment particles is usually in the range of 300 to 1,500 μm, preferably 300 to 1000 μm, and the porosity thereof (Porosity=1−(particle density)/(true density of particle)) is usually in the range of 0.1 to 0.3, preferably 0.1 to 0.25. When the porosity is less than 0.1, fine air bubbles contained in the pigment aggregate is sufficiently removed by deaeration thereof. However, the resultant granulated decoloring pigment particles exhibit a disadvantageously high cohesive force, so that it may tend to take a long period of time to homogeneously disperse the pigment particles in the concrete, though the generation of dusts can be prevented to a sufficient extent. On the other hand, when the porosity is more than 0.3, powdery ducts may be likely to be generated upon handling.

The granulated decoloring pigment particles can be obtained by adding to and mixing with raw pigment particles, a surfactant in an amount of usually 0.01 to 10% by weight based on the weight of the decoloring pigment particles, subjecting the mixed particles to compression deaeration treatment (compaction treatment) under such a condition that a line pressure of usually 10 to 100,000 g/cm is applied to a whole part of the mixed particles which are received within a predetermined space under a constrained condition, and then subjecting the thus compacted particles to granulation.

The average particle diameter of the raw pigment particles used for the production of the granulated decoloring pigment particles is usually 0.05 to 20 μm, preferably 0.1 to 10 μm.

When the amount of the surfactant added is more than 10% by weight, it becomes difficult to obtain granulated pigment particles having an appropriate strength, so that the granulated pigment particles may be likely to be destroyed and dusts may be likely to be generated, upon handling. On the other hand, when the amount of the surfactant added is less than 0.01% by weight, there may arise a tendency that it takes a long period of time to homogeneously disperse the pigment particles in the concrete.

As the surfactants usable for the production of the granulated decoloring pigment particles, there can be exemplified cationic surfactants, anionic surfactants, nonionic surfactants or ampholytic surfactants. Examples of the cationic surfactants may include alkyl amine salt-based surfactants, quaternary ammonium salt-based surfactants and the like. Examples of the anionic surfactants may include alkyl sulfate-based surfactants, alkyl benzene sulfonate-based surfactants, naphthalene sulfonate/formalin condensate-based surfactants, aromatic sulfonate/formalin condensate-based surfactants, carboxylic acid-type high-molecular surfactants, lignin sulfonate-based surfactants and the like. Examples of the nonionic surfactants may include polyoxyethylene alkyl ether, polyoxyethylene alkyl phenyl ether and the like. Examples of the ampholytic surfactants may include lauryl betaine-based surfactants, lauryl dimethylamine oxide-based surfactants and the like.

The compaction treatment can be carried out in such a manner that the compression force is applied to whole particles to be treated, which are received within a predetermined space under a constrained condition. In this case, the "constrained condition" in the present invention means such a state that the particles to be treated are withheld from moving freely and escaping from a stress field of the applied compression force, thereby forcibly applying the compression force to the particles.

As apparatuses for the compaction treatment which can satisfy the above-mentioned requirements, there may be exemplified a sand mill, an attrition mill, a roller compactor and the like. In the case where the compaction treatment is conducted using the sand mill or the attrition mill, a granulation drum is further used to obtain particles having a desired particle size. The use of the roller compactor is preferred, because the compaction treatment and the granulation treatment can be conducted simultaneously.

A line pressure applied upon the compression during the compaction treatment is in the range of usually 10 to 100,000 g/cm, preferably 100 to 50,000 g/cm. When the line pressure applied is less than 10 g/cm, the fine air bubbles contained in the granulated pigment particles may not be sufficiently removed by the deaeration and dusts may be likely to be generated, upon handling. When the line pressure applied is more than 100,000 g/cm, there may arise a tendency that it takes a long period of time to homogeneously disperse the pigment particles in the concrete.

In the present invention, the reason why the color of the colored concrete is converted into the color inherent to the ordinary plain concrete by the addition of the decoloring pigment according to the present invention, and the color of the thus obtained hardened concrete even if being allowed to stand for a long period, is kept unchanged, is considered as follows.

That is, by adding the decoloring pigment according to the present invention to a mixture of the colored concrete and the ordinary plain concrete simultaneously with the time at which both the concretes are kneaded together, the complementary pigment as a component of the decoloring pigment is mixed with a coloring pigment contained in the colored concrete, so that the color of the mixed concrete can be adjusted to that of the ordinary plain concrete. In this case, the lightness of the resultant concrete is slightly deteriorated. However, the deterioration in lightness can be compensated by mixing with the titanium oxide pigment, thereby maintaining the lightness at a level identical to that of the ordinary plain concrete.

In the case where a black-colored concrete is kneaded with the ordinary plain concrete, only the titanium oxide pigment is added simultaneously with the kneading of both the concretes, so that the lightness thereof can be improved and the resultant concrete can have a color similar to that of the ordinary plain concrete.

As described above, in accordance with the present invention, the color of the colored concrete can be readily converted into that of the ordinary plain concrete. For example, after the colored concrete is kneaded by a plant mixer and the like and discharged therefrom, the colored concrete residue which has been conventionally washed out and discarded, can be economically reused as a part of the ordinary plain concrete. Further, the decoloring method according to the present invention requires no complicated operations such as cleaning of the production facilities, treatments for purifying the waste water and making the waste water harmless, and the like. Furthermore, the ordinary plain concrete can be produced from the colored concrete in approximately continuous manner, thereby achieving a considerably high efficiency of the concrete production.

Furthermore, the decoloring method according to the present invention is also applicable to colored mortar which attaches to the agitator truck, and is much more useful as compared to the conventional method.

EXAMPLES

Next, the present invention is described in more detail below by way of Examples and Comparative Examples, but these Examples are not intended to limit the scope of the present invention.

Incidentally, the value of color difference of samples to be tested was measured by a calorimeter CR-3000 (manufactured by MINOLTA CO., LTD.) and expressed by using $\Delta E^*_{ab}$ set forth below, of the calorimetric system ($L^*$, $a^*$, $b^*$) according to JIS Z 8730.

$$\Delta E^*_{ab} = \{(\Delta L^*)^2 + (\Delta a^*)^2 + (\Delta b^*)^2\}^{1/2}$$

wherein $\Delta L^*$ represents a difference in lightness index $L^*$ between two objects and $\Delta a^*$ and $\Delta b^*$ represent differences in chromaticity indices $a^*$ and $b^*$ between the two objects, in the calorimetric system ($L^*$, $a^*$, $b^*$).

When the color difference $\Delta E^*_{ab}$ is not more than 1.5, it is considered that the desired decoloration of the colored concrete can be accomplished.

Example 1

20 liters of a colored concrete (containing Portland cement in an amount of 270 kg/m$^3$, and containing water of 60% by weight based on the weight of the cement and an orange pigment of 3.0% by weight based on the weight of the cement) to which the orange pigment (Tradename: EC-801 produced by TODA KOGYO CORP.) had been added, was kneaded in a pan-type concrete mixer (having a nominal volume of 20 liters) and then discharged therefrom. About 0.48 liter of the colored concrete residue containing about 5.4 g of the orange pigment, which attached into the pan-type concrete mixer.

Successively, 20 liters of an ordinary plain concrete (containing Portland cement in an amount of 270 kg/m$^3$, and containing water of 60% by weight based on the weight of the cement) was kneaded in the pan-type concrete mixer to which the colored concrete residue attached. Upon the kneading, a decoloring pigment in the form of a mixed powder composed of 50% by weight of a phthalocyanine blue pigment having an average particle diameter of 0.37 μm as a complementary pigment (Tradename: ROYAL BLUE, produced by MORISHITA BENGALA CO., LTD.) and 50% by weight of a titanium oxide pigment having an average particle diameter of 0.11 μm (Tradename: KD, produced by TITAN KOGYO CO., LTD.), was added to the concrete in an amount of 0.2% by weight based on the weight of cement contained in the ordinary plain concrete (which corresponds to 2 parts by weight of based on one part by weight of coloring pigment contained in the colored concrete residue).

The resultant ready-mixed concrete was packed in a sample mold (100 mmφ×200 mm) and hardened therein at 20° C. for 48 hours. Thereafter, the hardened concrete was removed from the mold and dried at 80° C. for 48 hours. The thus-obtained concrete sample showed a color difference $\Delta E^*_{ab}$ of 0.5 relative to the ordinary plain concrete and, therefore, was unable to be distinguished from the ordinary plain concrete.

Comparative Example 1

The same procedure as defined in Example 1 was conducted except that the decoloring pigment was not used, thereby obtaining a concrete sample. The thus-obtained concrete sample showed a color difference $\Delta E^*_{ab}$ of 1.7 relative to the ordinary plain concrete, and had a reddish color. As a result, the concrete sample was readily distinguishable from the ordinary plain concrete.

Example 2

20 liters of a colored concrete (containing Portland cement in an amount of 270 kg/m$^3$, and containing water of 60% by weight based on the weight of the cement and a black pigment of 3.0% by weight based on the weight of the cement) to which magnetite as the black pigment (Tradename: EC-371, produced by TODA KOGYO CORP.) had been added, was kneaded in a pan-type concrete mixer (having a nominal volume of 20 liters) and then discharged therefrom. About 0.54 liter of the colored concrete residue containing about 6.0 g of the black pigment, which attached into the pan-type concrete mixer.

Successively, 20 liters of an ordinary plain concrete (containing Portland cement in an amount of 300 kg/m3, and containing water of 55% by weight based on the weight of the cement) was kneaded with the colored concrete residue in the pan-type concrete mixer to which the colored concrete residue attached. Upon the kneading, a titanium oxide pigment having an average particle diameter of 0.11 μm as a decoloring pigment (Tradename: KD, produced by TITAN KOGYO CO., LTD.) was added to the concrete in an amount of 0.5% by weight based on the weight of cement contained in the ordinary plain concrete (which corresponds to 5 parts by weight of based on one part by weight of coloring pigment contained in the colored concrete residue).

The obtained ready-mixed concrete was packed in a sample mold (100 mmφ×200 mm) and hardened therein at 20° C. for 48 hours. Thereafter, the hardened concrete was removed from the mold and dried at 80° C. for 48 hours. The thus-obtained concrete sample showed a color difference $\Delta E^*_{ab}$ of 0.7 relative to the ordinary plain concrete and, therefore, was unable to be distinguished from the ordinary plain concrete.

Comparative Example 2

The same procedure as defined in Example 2 was conducted except that the decoloring pigment was not used, thereby obtaining a concrete sample. The thus-obtained concrete sample showed a color difference $\Delta E^*_{ab}$ of 2.8 relative to the color of the ordinary plain concrete, and had a blackish color. As a result, the concrete sample was readily distinguishable from the ordinary plain concrete.

Preparation of Granulated Decolorin Pigment Particles 1

2.66 kg of titanium oxide having an average particle diameter of 0.11 μm as white pigment particles (Tradename: KD, produced by TITAN KOGYO CO., LTD.), 0.14 kg of acicular goethite pigment having an average particle diameter of 0.80 μm as yellow pigment particles (Tradename: YELLOW 48, produced by TODA KOGYO CORP.) and 56 g of a sodium salt of β-naphthalene sulfonic acid/formalin condensate as an anionic surfactant (Tradename: MIGHTY 100, produced by KAO CO., LTD.) were dry-mixed together in a Henschel mixer (having a nominal volume of 10 liters) at 1,440 rpm for 5 minutes, thereby obtaining light yellow pigment particles treated with the anionic surfactant.

Next, the obtained light yellow pigment particles were subjected to compaction and granulation treatments by a roller-compactor (WP 105×40, manufactured by Turbo Kogyo CO., LTD.) under a line pressure of 20 kg/cm. Successively, the treated pigment particles were crushed and classified by ordinary methods, thereby obtaining granulated light yellow pigment particles having an average particle diameter of 590 μm, a porosity of 0.24 and a bulk density of 0.76 g/ml.

Preparation of Granulated Decoloring Pigament Particles 2

1.35 kg of titanium oxide having an average particle diameter of 0.11 gm as white pigment particles (Tradename: KD, produced by TITAN KOGYO CO., LTD.), 0.90 kg of phthalocyanine blue pigment having an average particle diameter of 0.37 μm as blue pigment particles (Tradename: ROYAL BLUE, produced by MORISHITA BENNGARA CO., LTD.), 0.45 kg of hematite having an average particle diameter of 0.11 μm as red pigment particles (Tradename: 100 ED, produced by TODA KOGYO CORP.) and 54 g of calcium lignin-sulfonate as an anionic surfactant (Tradename: POZOLIS NO. 8, produced by NMB CO., LTD.) were dry-mixed together by a Henschel mixer (having a nominal volume of 10 liters) at 1,440 rpm for 5 minutes, thereby obtaining light purple pigment particles treated with the anionic surfactant.

Next, the obtained light purple pigment particles were subjected to compaction and granulation treatments by a roller-compactor (WP 105×40, manufactured by Turbo Kogyo CO., LTD.) under a line pressure of 20 kg/cm. Successively, the treated pigment particles were crushed and classified by ordinary methods, thereby obtaining granulated light purple pigment particles having an average particle diameter of 520 μm, a porosity of 0.25 and a bulk density of 0.72 g/ml.

Example 3

20 liters of a colored concrete (containing Portland cement in an amount of 270 kg/m$^3$, and containing water of 60% by weight based on the weight of the cement and a black pigment of 5.0% by weight based on the weight of the cement) to which magnetite as the black pigment particles (Tradename: EC-301, produced by TODA KOGYO CO., LTD.) had been added, was kneaded in a pan-type concrete mixer (having a nominal volume of 20 liters) and then discharged therefrom. About 0.50 liter of the colored concrete residue containing about 9.3 g of magnetite, which attached into the pan-type concrete mixer.

Successively, 20 liters of an ordinary plain concrete (containing Portland cement in an amount of 300 kg/m³ and containing water of 55% by weight based on the weight of the cement) was kneaded in the pan-type concrete mixer to which the colored concrete residue attached. Upon the kneading, 30 g of the granulated decoloring pigment particles 1 prepared above were added to the concrete (which corresponds to 4.5 parts by weight of based on one part by weight of coloring pigment contained in the colored concrete residue).

The obtained ready-mixed concrete was packed in a sample mold (100 mmφ×200 mm) and hardened therein at 20° C. for 48 hours. Thereafter, the hardened concrete was removed from the mold and dried at 80° C. for 48 hours. The thus-obtained concrete sample showed a color difference $\Delta E^*_{ab}$ of 0.6 relative to the color of the ordinary plain concrete and, therefore, was unable to be distinguished from the ordinary plain concrete.

Example 4

4.5 m³ of a colored concrete (containing Portland cement in an amount of 300 kg/m³ and containing water of 55% by weight based on the weight of the cement and a green pigment of 3.0% by weight based on the weight of the cement) to which chromium oxide pigment having an average particle diameter of 0.30 μm as green pigment particles (Tradename: F-3, produced by NIPPON KAGAKU KOGYO CO., LTD.) had been added, was kneaded in an agitator truck (having a nominal volume of 4.5 m³) and then discharged therefrom. About 70 liters of colored concrete (mortar) residue containing about 870 g of chromium oxide, which attached into the agitator truck.

Successively, 4.5 m³ of an ordinary plain concrete (containing blast furnace cement B in an amount of 269 kg/m³ and containing water of 56.5% by weight based on the weight of the cement) was kneaded with the colored concrete residue in the agitator truck. Upon the kneading, 5.22 kg of the granulated decoloring pigment particles 2 prepared above were added to the concrete (which corresponds to 6 parts by weight of based on one part by weight of coloring pigment contained in the colored concrete residue).

The obtained ready-mixed concrete was packed in a sample mold (100 mmφ×200 mm) and hardened therein at 200° C. for 48 hours. Thereafter, the hardened concrete was removed from the mold and dried at 80° C. for 48 hours. The thus-obtained concrete sample showed a color difference $\Delta E^*_{ab}$ of 1.0 relative to the color of the ordinary plain concrete and, therefore, was unable to be distinguished from the ordinary plain concrete.

Example 5

18.9 kg of a decoloring pigment containing 33% by weight of acicular goethite having an average major axis. particle diameter of 0.78 μm (Tradename: EC-481, produced by TODA KOGYO CORP.) and 67% by weight of titanium oxide pigment having an average particle diameter of 0.11 μm (Tradename: KD, produced by TITAN KOGYO CO., LTD.) was added to 1.5 m³ of a residue of colored concrete (containing blast furnace cement type-B in an amount of 280 kg/m³, and containing water of 60% by weight based on the weight of the cement and a blue pigment of 3.0% by weight based on the weight of the cement), which remained an inside of an agitator truck (having a nominal volume of 4.5 m³) and contained as the blue pigment, cobalt blue (Tradename: DAIVIROXIDE BLUE #9452, produced by DAI-NICHI SEIKA KOGYO CO., LTD.), and then the mixture was kneaded together in the agitator truck (which corresponds to 1.5 parts by weight of based on one part by weight of coloring pigment contained in the colored concrete residue).

The obtained ready-mixed concrete was packed in a sample mold (100 mmφ×200 mm) and hardened therein at 20° C. for 48 hours. Thereafter, the hardened concrete was removed from the mold and dried at 80° C. for 48 hours. The thus-obtained concrete sample showed a color difference $\Delta E^*_{ab}$ of 1.2 relative to the color of the ordinary plain concrete. Since it was difficult to distinguish the concrete sample from the ordinary plain concrete, the color of the sample concrete was regarded as identical to that of the ordinary plain concrete.

What is claimed is:

1. A method of decoloring a colored concrete containing a colored pigment comprising adding to the colored concrete a decoloring pigment comprising (1) a titanium oxide pigment or (2) a titanium oxide pigment and a pigment having a complementary color relative to color of the colored concrete, wherein the amount of the decoloring pigment added to the colored concrete is 0.5 to 10 parts by weight based on one part by weight of the coloring pigment contained in the colored concrete.

2. A method according to claim 1, wherein the decoloring pigment comprises a titanium oxide pigment.

3. A method according to claim 1, which comprises adding to the colored concrete, a decoloring pigment comprising a titanium oxide pigment and a pigment having a complementary color relative to color of the colored concrete.

4. A method according to claim 1, wherein the decoloring pigment comprises 1 to 75% by weight of the pigment having a complementary color relative to color of the colored concrete and 25 to 99% by weight of the titanium oxide pigment.

5. A method according to claim 1, wherein the pigment having a complementary color relative to color of the colored concrete is at least one pigment selected from the group consisting of magnetite, maghemite, hematite, iron oxide hydroxide, chromium oxide, cobalt blue, phthalocyanine blue and phthalocyanine green.

6. A method according to claim 1, wherein the decoloring pigment is in the form of granulated particles having an average particle diameter of 300 to 1,500 μm and a porosity of 0.1 to 0.3.

7. A method according to claim 6, wherein the granulated particles comprise:

a titanium oxide pigment or a titanium oxide pigment and a pigment having a complementary color relative to color of the colored concrete, and 0.01 to 10% by weight of a surfactant selected from the group consisting of cationic surfactants, anionic surfactants, nonionic surfactants and ampholytic surfactants, based on the total weight of the pigment and the titanium oxide pigment.

8. A method according to claim 6, wherein the granulated particles are obtained by subjecting a mixture comprising a titanium oxide pigment or a titanium oxide pigment and a pigment having a complementary color relative to color of the colored concrete and 0.01 to 10% by weight of a surfactant selected from the group consisting of cationic surfactants, anionic surfactants, nonionic surfactants and ampholytic surfactants, based on the weight of the granulated particles, to compaction and granulation treatments.

9. A method according to claim 1, wherein the colored concrete is an unhardened fresh colored concrete and an unhardened colored mortar.

10. A method of decoloring a colored concrete comprising adding to a colored concrete a decoloring pigment comprising 1 to 75% by weight of at least one pigment selected from the group consisting of magnetite, maghemite, hematite, iron oxide hydroxide, chromium oxide, cobalt blue, phthalocyanine blue and phthalocyanine green, which is a pigment having a complementary color relative to color of a colored concrete, and 25 to 99% by weight of a titanium oxide pigment, wherein the amount of the decoloring pigment added to the colored concrete is 0.5 to 10 parts by weight based on one part by weight of a coloring pigment contained in the colored concrete.

11. A decoloring pigment comprising granulated particles having an average particle diameter of 300 to 1,500 μm and a porosity of 0.1 to 0.3 comprising:

1 to 75% by weight of at least one pigment selected from the group consisting of magnetite, maghemite, hematite, iron oxide hydroxide, chromium oxide, cobalt blue, phthalocyanine blue and phthalocyanine green, which is a pigment having a complementary color relative to color of a colored concrete, and 25 to 99% by weight of a titanium oxide pigment.

12. A decoloring pigment according to claim 11, which further comprises 0.01 to 10% by weight of a surfactant selected from the group consisting of cationic surfactants, anionic surfactants, nonionic surfactants and ampholytic surfactants, based on the total weight of the pigment and titanium oxide pigment.

13. A decoloring pigment according to claim 11, wherein the granulated particles are obtained by subjecting a mixture comprising a titanium oxide pigment or a titanium oxide pigment and a pigment having a complementary color relative to color of the colored concrete and 0.01 to 10 % by weight of a surfactant selected from the group consisting of cationic surfactants, anionic surfactants, nonionic surfactants and ampholytic surfactants, based on the total weight of the pigment and titanium oxide pigment, to compaction and granulation treatments.

* * * * *